US012791142B2

(12) United States Patent
Xu et al.

(10) Patent No.: US 12,791,142 B2
(45) Date of Patent: Nov. 10, 2026

(54) ADJUSTABLE BRACKET

(71) Applicant: XINADDA (HONG KONG) LIMITED, Kowloon (HK)

(72) Inventors: Hao Xu, Guangdong (CN); Lei Sun, Guangdong (CN)

(73) Assignee: XINADDA (HONG KONG) LIMITED, Hong Kong (CN)

( * ) Notice: Subject to any disclaimer, the term of this patent is extended or adjusted under 35 U.S.C. 154(b) by 68 days.

(21) Appl. No.: 19/018,622

(22) Filed: Jan. 13, 2025

(65) Prior Publication Data

US 2026/0146702 A1 May 28, 2026

(30) Foreign Application Priority Data

Nov. 22, 2024 (CN) ......................... 202422870631.0

(51) Int. Cl.
*F16M 11/12* (2006.01)
*A47B 97/00* (2006.01)
*F16M 11/04* (2006.01)

(52) U.S. Cl.
CPC ......... *F16M 11/121* (2013.01); *A47B 97/001* (2013.01); *F16M 11/046* (2013.01); *F16M 2200/066* (2013.01)

(58) Field of Classification Search
CPC ... F16M 11/121; F16M 11/046; A47B 97/001
USPC ....................................................... 248/277.1
See application file for complete search history.

(56) References Cited

U.S. PATENT DOCUMENTS 8,864,092 B2 * 10/2014 Newville ............... F16M 13/02 361/679.01
11,779,115 B2 * 10/2023 Pei ....................... A47B 97/001 248/277.1
12,163,621 B2 * 12/2024 Xu ......................... F16M 13/02
12,622,520 B2 * 5/2026 Xiao .................... A47B 97/001

* cited by examiner

*Primary Examiner* — Todd M Epps
(74) *Attorney, Agent, or Firm* — Maschoff Brennan

(57) ABSTRACT

Embodiments of the present disclosure include an adjustable bracket, configured to connect a device and a wall body, including: a supporting mechanism, an adjusting mechanism and a connecting mechanism. One end of the supporting mechanism is connected to the wall body; the adjusting mechanism is arranged at the other end of the supporting mechanism; the device is connected to the adjusting mechanism through the connecting mechanism, the adjusting mechanism includes a sliding block, a sliding groove is formed in the connecting mechanism, a length direction of the sliding groove is arranged in a first direction Z, the sliding block is slidably arranged in the sliding groove, the connecting mechanism is configured to carry the device to move in a length direction of the sliding groove, and a position of the connecting mechanism relative to the adjusting mechanism is able to be fastened by a first fastener.

10 Claims, 18 Drawing Sheets

ADJUSTABLE BRACKET

TECHNICAL FIELD

The present disclosure relates to the technical field of television brackets, in particular to an adjustable bracket.

BACKGROUND

A TV bracket is a peripheral device specifically designed for mounting a flat-screen television or an LCD television on a wall. It is suitable for various settings, such as living rooms, bedrooms, and offices. Current TV brackets typically require the television's position to be predetermined during mounting, and once mounted, the television's position cannot be adjusted. If a user finds the mounting height unsuitable after using, it becomes difficult to adjust, which diminishes the user experience.

SUMMARY OF THE INVENTION

In view of this, the present disclosure provides an adjustable bracket to solve the problem that a height of a television cannot be adjusted after an existing bracket is mounted.

In a first aspect, the present disclosure provides an adjustable bracket, configured to connect a device and a wall body, and including:

a supporting mechanism, wherein one end of the supporting mechanism is connected to the wall body;

an adjusting mechanism, arranged at the other end of the supporting mechanism; and a connecting mechanism, wherein the device is connected to the adjusting mechanism through the connecting mechanism, the adjusting mechanism includes a sliding block, a sliding groove is formed in the connecting mechanism, a length direction of the sliding groove is arranged in a first direction Z, the sliding block is slidably arranged in the sliding groove, the connecting mechanism is configured to carry the device to move in the length direction of the sliding groove, and a position of the connecting mechanism relative to the adjusting mechanism is able to be fastened by a first fastener.

Beneficial effects: the sliding blocks are arranged on the adjusting mechanism of the adjustable bracket, the sliding grooves are formed in the connecting mechanism, and the supporting mechanism is fixed to the wall body, so that the connecting mechanism can move along the sliding grooves relative to the adjusting mechanism connected to the supporting mechanism; because the length directions of the sliding grooves are arranged in the first direction Z, the device connected to the connecting mechanism can move in the first direction Z together with the connecting mechanism, so a height of the device can be adjusted; and when the device moves to a height desired by a user, the connecting mechanism may be locked by the first fastener to lock the device at the height, thus satisfying the needs of the user. After mounting, the adjustable bracket can easily adjust the height of the device, the problem of repetitive dismantling of the bracket and the device is prevented, the problem of repetitive perforating the wall body is also prevented at the same time, adjustment is simple, convenient and fast, and users'satisfaction is improved.

In the embodiment, the first direction Z is a direction extending in a vertical direction.

In an optional implementation, the connecting mechanism includes a panel, sliding grooves are formed in two sides of the panel, the sliding grooves extend in a length direction of the panel, the adjusting mechanism includes two sliding blocks, and one sliding block is arranged in each of the sliding grooves.

Beneficial effects: the sliding grooves are formed in both sides of the panel, and one sliding block is arranged in each of the sliding grooves, so the connecting mechanism may slide smoothly. Therefore, the situation that the connecting mechanism is tilted when carrying a heavy device is prevented, the connecting mechanism and the adjusting mechanism are imposed with even stress, and the user's adjustment is easy and simple.

In an optional implementation, two side walls of each sliding groove bend towards each other at an opening of the sliding groove to form a first position-limiting part.

Beneficial effects: the first position-limiting part can limit the sliding blocks to ensure that the sliding blocks are located in the sliding grooves all the time, so the sliding blocks are prevented from falling from openings of the sliding grooves in an adjustment process of the connecting mechanism, an adjustment difficulty is lowered and at the same time, mounting of the sliding blocks is facilitated.

In an optional implementation, the adjusting mechanism further includes a first adjusting member, a first installation groove is formed in the first adjusting member, the panel is slidably arranged in the first installation groove, and the two sliding blocks are arranged on two sides of an opening of the first installation groove Beneficial effects: by forming the first installation groove in the first adjusting member, upward/downward sliding of the panel is more stable, and at the same time, fixed positions are provided for the sliding blocks to ensure stable arrangement of the sliding blocks.

In an optional implementation, the first adjusting member is provided with first connecting plates on the two sides of the opening of the first installation groove, a first connecting hole is formed in each first connecting plate, one end of the first fastener is in bolt connection with a corresponding first connecting hole and a corresponding sliding block, and the other end of the first fastener is configured to abut against a bottom of a corresponding sliding groove.

Beneficial effects: the first fastener is in bolt connection with the corresponding first connecting hole and the corresponding sliding block. During adjustment of the connecting mechanism, the first fastener is loosened so that an end part of the first fastener is away from the bottom of the sliding groove, clamping forces of the first fastener on two sides against the panel is reduced, the panel can slide in the first installation groove to adjust the position, and the sliding blocks can have a guiding effect on the panel and facilitate smooth sliding of the panel. When a position of the connecting mechanism needs to be fixed, it is merely necessary to fasten the first fastener so that end parts of the first fastener firmly abut against the bottom of the sliding groove and clamp the panel to fix the position of the panel.

In an optional implementation, limiting protrusions are formed on two ends, in the length direction of the sliding groove, of each first connecting plate, and the limiting protrusions extend in a depth direction of the sliding groove.

Beneficial effects: the limiting protrusions are formed on both ends of each first connecting plate in the length direction of the sliding groove, in a process of sliding adjustment of the connecting mechanism, the sliding blocks can be maintained inside the sliding grooves, the sliding blocks are prevented from falling out of the sliding grooves, and an adjustment difficulty is lowered.

In an optional implementation, the adjusting mechanism further includes a hinge and two second adjusting members, the second adjusting members are connected with the supporting mechanism, the second adjusting members are hinged to the first adjusting member by means of the hinge, and the first adjusting member is able to carry the sliding blocks and the connecting mechanism to rotate around a second direction X.

Beneficial effects: through hinging the first adjusting member and the second adjusting members, the first adjusting member can rotate around the second direction X relative to the second adjusting member and the supporting mechanism, the device can be carried to move, and an angle of pitch of the device can be adjusted.

In an optional implementation, first adjusting holes are formed in two ends of each second adjusting member, a hinge hole is formed at a position between the two first adjusting holes, the adjusting mechanism further includes second fasteners, and each second fastener is arranged to pass through a corresponding first adjusting hole to be in bolt connection with the first adjusting member.

Beneficial effects: through the arrangement of the first adjusting holes, a position of the first adjusting member relative to the second adjusting members can be adjusted by rotating the first adjusting member, and the position of the first adjusting member relative to the second adjusting member can be locked through the second fastener, therefore locking the angle of pitch of the device.

In an optional implementation, each of the two first adjusting holes has an equal distance to the hinge hole.

Beneficial effects: through the above arrangement, smooth rotation of the first adjusting member can be ensured, preventing any jamming.

In an optional implementation, a major axis of each first adjusting hole is a line segment along a circle centered at a center point of the hinge hole.

Beneficial effects: when the first adjusting member needs to be rotated, it is merely necessary to loosen the second fastener. At the moment, rotation of the first adjusting member will carry the second fastener to rotate together with the hinge. By arranging the major axis of each first adjusting hole to be the line segment along the circle centered at the center point of the hinge hole, interference of the first adjusting hole on the second fastener can be prevented, and smooth rotation is thereby ensured.

BRIEF DESCRIPTION OF THE DRAWINGS

In order to more clearly explain specific implementations of the present disclosure or the technical solution in the prior art, the accompanying drawings to be used in the description of the specific implementations or the prior art will be briefly described below. Apparently, the accompanying drawings in following description are some implementations of the present disclosure. For those ordinarily skilled in the art, other accompanying drawings may also be obtained based on these accompanying drawings without inventive efforts.

REFERENCE NUMERALS IN THE ACCOMPANYING DRAWINGS

Figure 1:
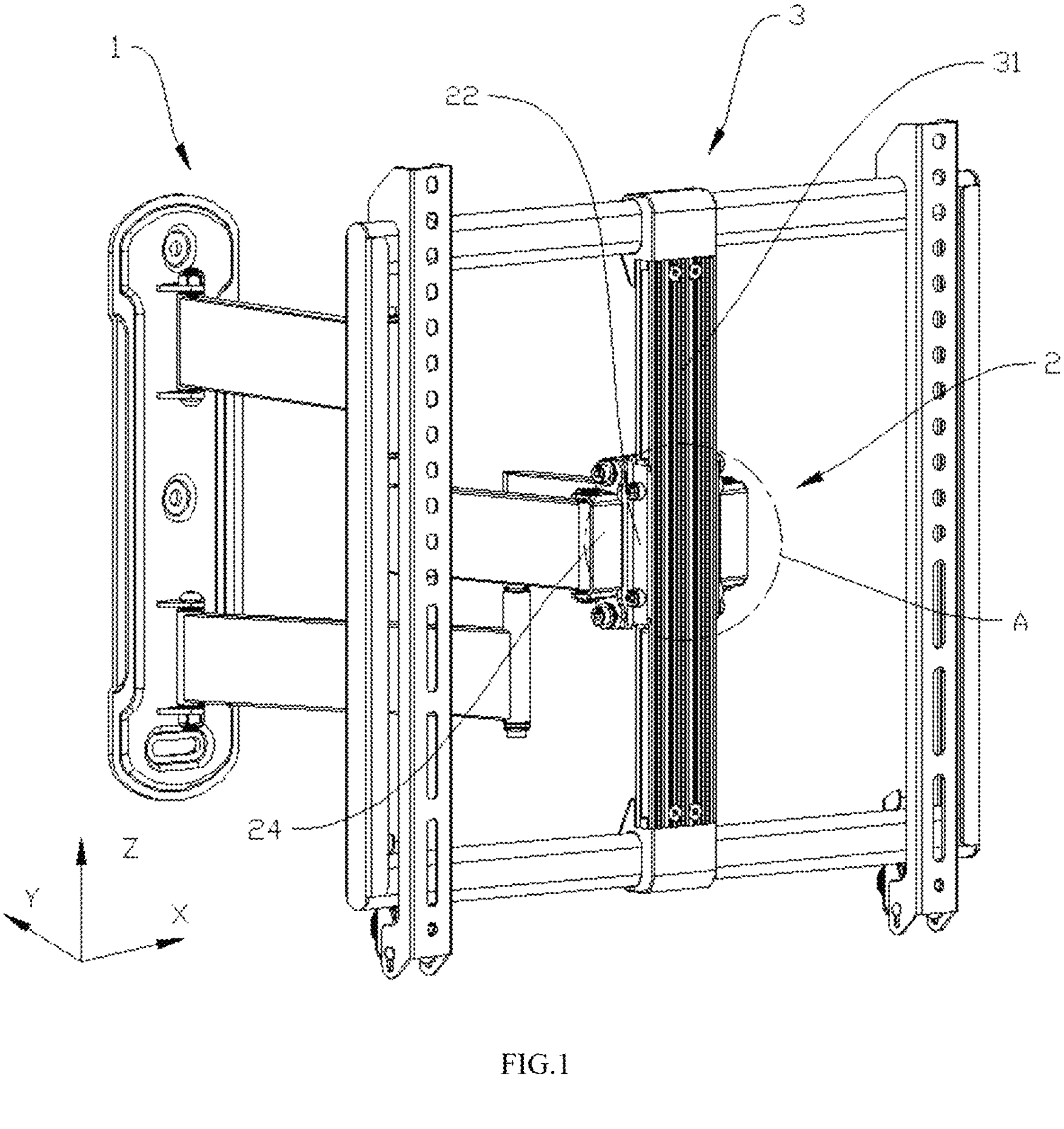
FIG. 1 is a schematic structural diagram of an adjustable bracket in an embodiment of the present disclosure.
Figure 2:
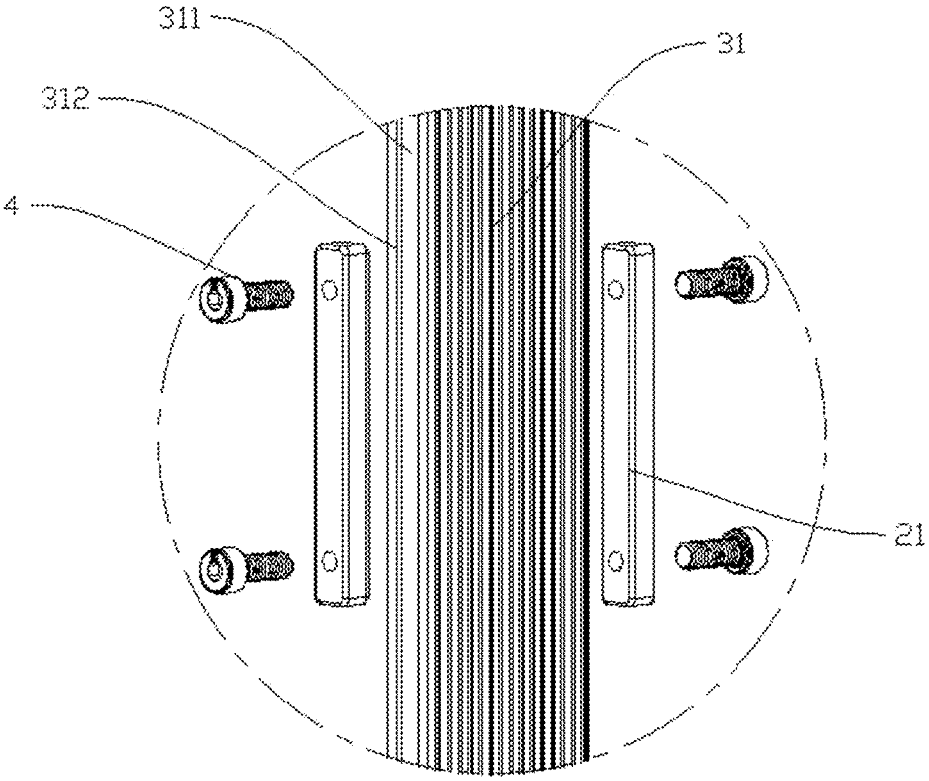
FIG. 2 is an enlarged structural exploded view of a sliding block at a position A, a panel and a first fastener in FIG. 1.
Figure 3:
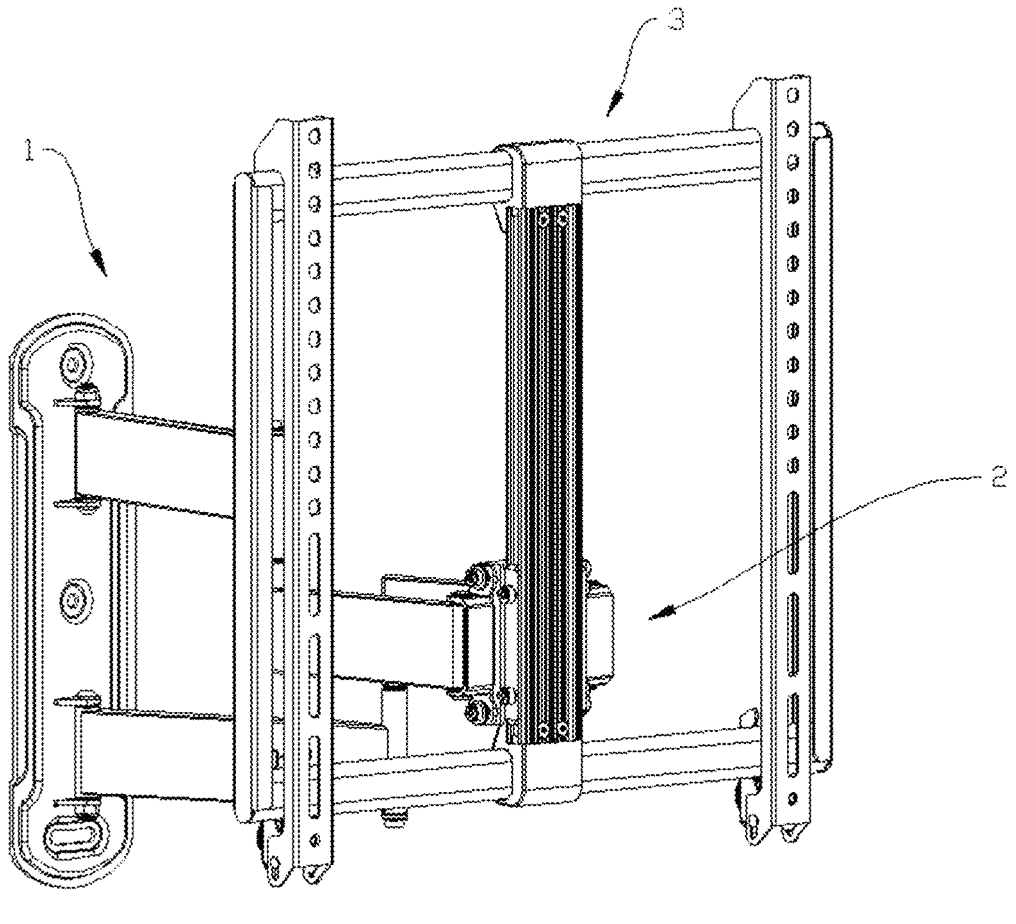
FIG. 3 is a schematic diagram of a status of adjusting a height of a connecting mechanism in an embodiment of the present disclosure.
Figure 4:
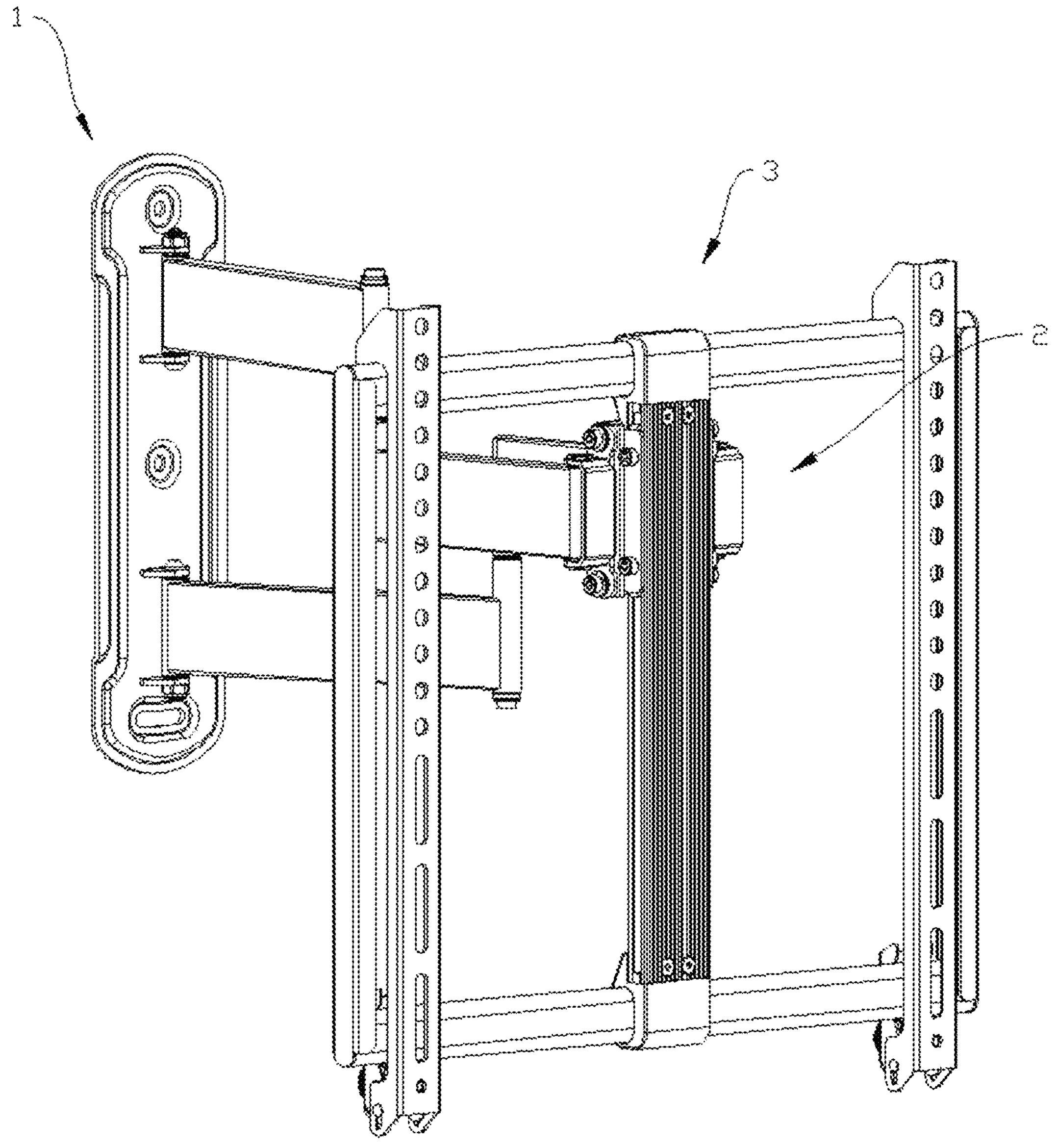
FIG. 4 is another schematic diagram of a status of adjusting a height of a connecting mechanism in an embodiment of the present disclosure.
Figure 5:
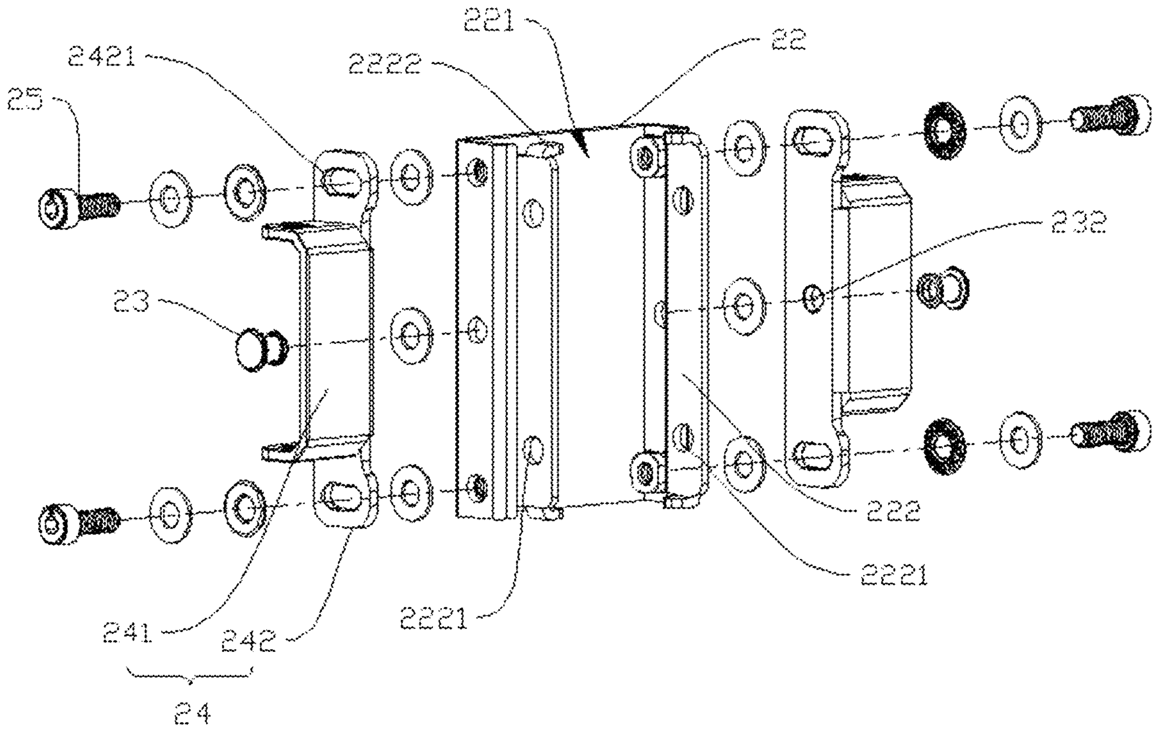
FIG. 5 is a structural exploded view of an adjusting mechanism in an embodiment of the present disclosure.
Figure 6:
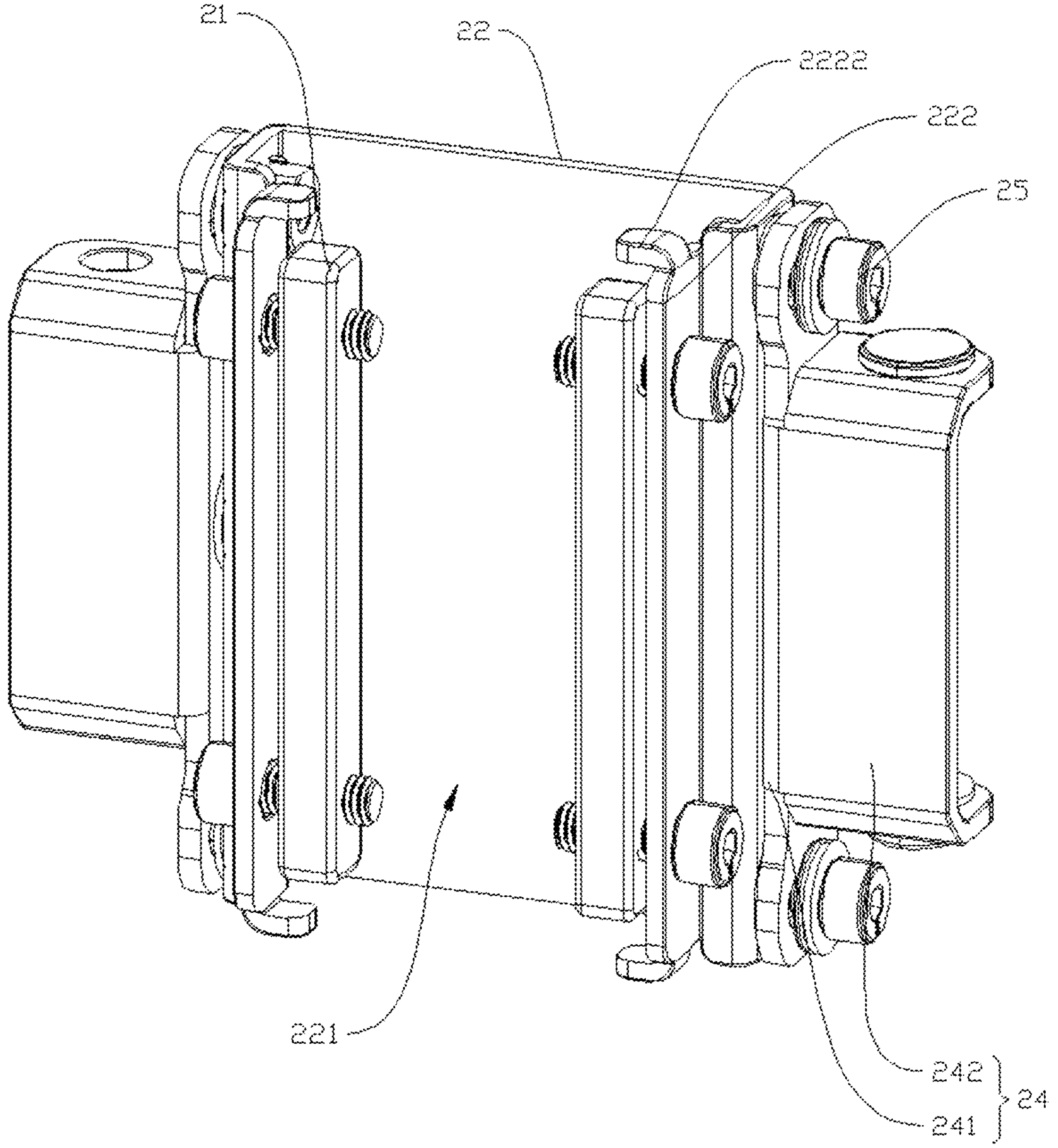
FIG. 6 is a schematic structural diagram of adjusting a connecting mechanism in an embodiment of the present disclosure.
Figure 7:
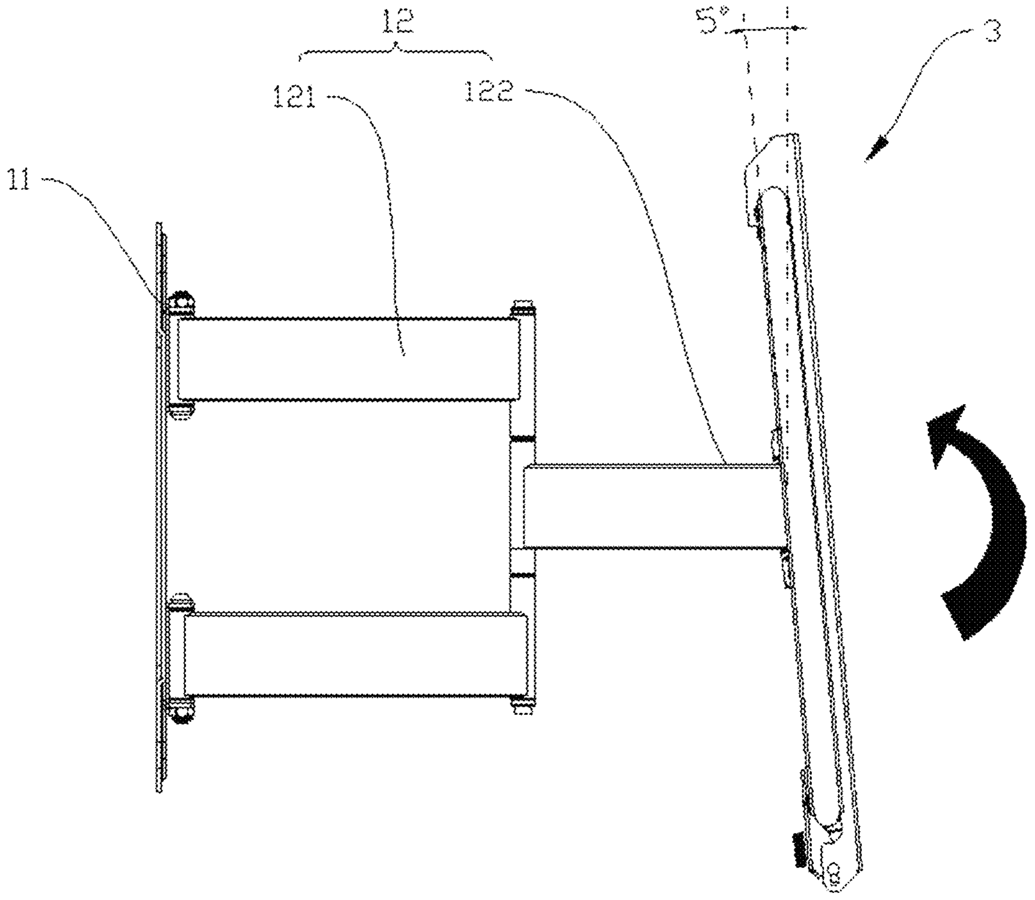
FIG. 7 is a schematic diagram of a status of adjusting an angle of pitch of a connecting mechanism in an embodiment of the present disclosure.
Figure 8:
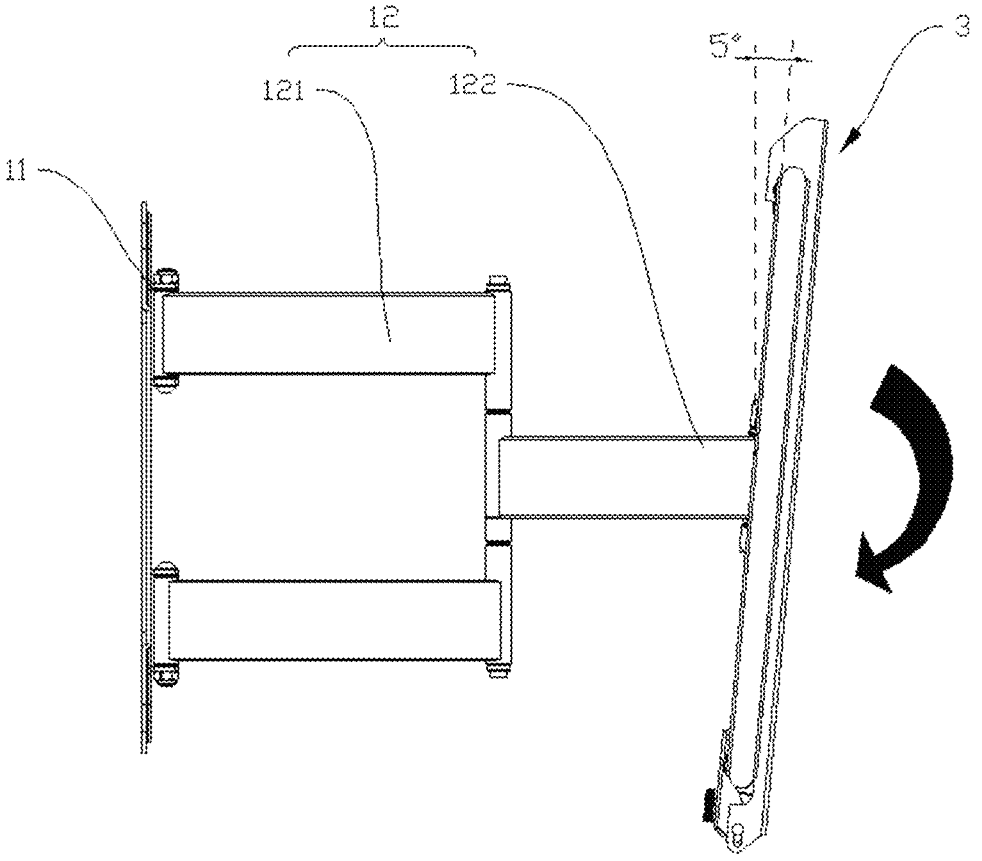
FIG. 8 is another schematic diagram of a status of adjusting an angle of pitch of a connecting mechanism in an embodiment of the present disclosure.

100, Device;
- 1, Supporting mechanism; 11, Supporting plate; 12, Connecting rod assembly; 121, First supporting arm; 122, Second supporting arm;
- 2, Adjusting mechanism; 21, Sliding block; 22, First adjusting member; 221, First installation groove; 222, First connecting plate; 2221, First connecting hole; 2222, Limiting protrusion; 223, Hinge hole; 23, hinge; 24, Second adjusting member; 241, First part; 242, Second part; 2421, First adjusting hole; 25, Second fastener;
- 3, Connecting mechanism; 31, Panel; 311, Sliding groove; 312, First position-limiting part; 32, Surface frame; 321, Horizontal rod; 322, Vertical rod; 33, Connecting support; 331, Second installation groove; 34, Safety latch; 35; Third fastener; 36. Adjusting bolt; and
- 4; First fastener.

DETAILED DESCRIPTION

In order to more clearly explain the objectives, technical solutions and advantages of embodiments of the present disclosure, technical solutions of the embodiments of the present disclosure will be clearly and completely described below in conjunction with accompanying drawings of the embodiments of the present disclosure. Apparently, the described embodiments are a part of the embodiments of the present disclosure, not all of them. Based on the embodiments of the present disclosure, all other embodiments obtained by those ordinarily skilled in the art without the need for creative labor fall within the scope of protection of the present disclosure.

Embodiments of an adjustable bracket in the present disclosure will be described below in combination with FIG. 1 to FIG. 18.

According to an embodiment of the present disclosure, in one aspect, an adjustable bracket is provided, configured to connect a device 100 and a wall body, and including: a supporting mechanism 1, an adjusting mechanism 2, and a connecting mechanism 3. One end of the supporting mechanism 1 is connected to the wall body; the adjusting mechanism 2 is arranged at the other end of the supporting mechanism 1; the device 100 is connected to the adjusting mechanism 2 through the connecting mechanism 3, the adjusting mechanism 2 includes a sliding block 21, a sliding groove 311 is formed in the connecting mechanism 3, a length direction of the sliding groove 311 is arranged in a first direction Z, the sliding block 21 is slidably arranged in the sliding groove 311, the connecting mechanism 3 is configured to carry the device 100 to move in the length direction of the sliding groove 311, and a position of the connecting mechanism 3 relative to the adjusting mechanism 2 is able to be fastened by a first fastener 4.

The sliding blocks 21 are arranged on the adjusting mechanism 1 of the adjustable bracket provided by the embodiment, the sliding grooves 311 are formed in the connecting mechanism 3, and the supporting mechanism 1 is fixed to the wall body, so that the connecting mechanism 3 can move along the sliding grooves 311 relative to the adjusting mechanism 2 connected to the supporting mechanism 1; because the length directions of the sliding grooves 311 are arranged in the first direction Z, the device 100 connected to the connecting mechanism 3 can move in the first direction Z together with the connecting mechanism 3, so a height of the device 100 can be adjusted; and when the device 100 moves to a height desired by a user, the connecting mechanism 3 may be locked by the first fastener 4 to lock the device 100 at the height, thus satisfying the needs of the user. After mounting, the adjustable bracket can easily adjust the height of the device 100, the problem of repetitive dismantling of the bracket and the device 100 is prevented, the problem of repetitive perforating the wall body is also prevented at the same time, adjustment is simple, convenient and fast, and users'satisfaction is improved.

In the embodiment, the first direction Z is a direction extending in a vertical direction, so adjustment of the device 100 in a height direction is realized.

In the embodiment, the first fastener 4 is a hexagon socket bolt. It may be an ordinary bolt in other embodiments.

In one embodiment, the connecting mechanism 3 includes a panel 31, sliding grooves 311 are formed in two sides of the panel 31, the sliding grooves 311 extend in a length direction of the panel 31, the adjusting mechanism 2 includes two sliding blocks 21, and one sliding block 21 is arranged in each of the sliding grooves 311. The sliding grooves 311 are formed in both sides of the panel 31, and one sliding block 21 is arranged in each of the sliding grooves 311, so the connecting mechanism 3 may slide smoothly. Therefore, the situation that the connecting mechanism 3 is tilted when carrying a heavy device 100 is prevented, the connecting mechanism 3 and the adjusting mechanism 2 are imposed with even stress, and the user's adjustment is easy and simple.

In one embodiment, two side walls of each sliding groove 311 bend towards each other at an opening of the sliding groove to form a first position-limiting part 312. The first position-limiting part 312 can limit the sliding blocks 21 to ensure that the sliding blocks 21 are located in the sliding grooves 311 all the time, so the sliding blocks 21 are prevented from falling from openings of the sliding grooves 311 in a process of adjusting the connecting mechanism 3, an adjustment difficulty is lowered and at the same time, mounting of the sliding blocks 21 is facilitated.

In one embodiment, the adjusting mechanism 2 further includes a first adjusting member 2, a first installation groove 221 is formed in the first adjusting member 22, the panel 31 is slidably arranged in the first installation groove 221, and the two sliding blocks 21 are arranged on two sides of an opening of the first installation groove 221. By forming the first installation groove 221 in the first adjusting member 22, upward/downward sliding of the panel 31 is more stable, and at the same time, fixed positions are provided for the sliding blocks 21 to ensure stable arrangement of the sliding blocks 21.

In one embodiment, the first adjusting member 22 is provided with first connecting plates (222) arranged on the two sides of the opening of the first installation groove 221, a first connecting hole 2221 is formed in each first connecting plate 222, one end of the first fastener 4 is in bolt connection with a corresponding first connecting hole 2221 and a corresponding sliding block 21, and the other end of the first fastener 4 is configured to abut against a bottom of a corresponding sliding groove 311. The first fastener 4 is in bolt connection with the corresponding first connecting hole 2221 and the corresponding sliding block 21. During adjustment of the connecting mechanism 3, the first fastener 3 is loosened so that an end part of the first fastener 4 is away from the bottom of the sliding groove 311, clamping forces of the first fastener 4 on two sides against the panel 31 is reduced, the panel 31 can slide in the first installation groove 221 to adjust the position, and the sliding blocks 21 can have a guiding effect on the panel 31 and facilitate smooth sliding of the panel 31. When a position of the connecting mechanism 3 needs to be fixed, it is merely necessary to fasten the first fastener 4 so that end parts of the first fastener 4 firmly abut against the bottom of the sliding groove 311 and clamp the panel 31 to fix the position of the panel 31.

In one embodiment, two first connecting holes 2221 are formed in each first connecting plate 222, the two first connecting holes 2221 are arranged at interval in the first direction Z, and each first connecting hole 2221 is in bolt connection with a first fastener 4, so more stable connection with the sliding block 21 is facilitated, shaking of the sliding block 21 is reduced, wear of the sliding block 21 at a single position is reduced, and at the same time, clamping by the first fastener 4 on the panel 31 can be more stable. In other embodiments, more first connecting holes 2221 may be arranged according to a size of the adjustable bracket and sizes of the sliding blocks 21, so as to ensure stable clamping of the panel 31 and ensure stability of mounting devices 100 of larger sizes.

In one embodiment, limiting protrusions 2222 are formed on two ends, in the length direction of the sliding groove 311, of each first connecting plate 222, and the limiting protrusions 2222 extend in a depth direction of the sliding groove 311. The limiting protrusions 2222 are formed on both ends of each first connecting plate 222 in the length direction of the sliding groove 311, in a process of sliding adjustment of the connecting mechanism 3, the sliding blocks 21 can be maintained inside the sliding grooves 311, the sliding blocks 21 are prevented from falling out of the sliding grooves 311, and an adjustment difficulty is lowered.

In one embodiment, the adjusting mechanism 2 further includes a hinge 23 and two second adjusting members 24, the second adjusting members 24 are connected with the supporting mechanism 1, the second adjusting members 24 are hinged to the first adjusting member 22 by means of the hinge 23, and the first adjusting member 22 is able to carry the sliding blocks 21 and the connecting mechanism 3 to rotate around a second direction X. The second adjusting member 24 is hinged to the first adjusting member 22, so that the first adjusting member 22 can rotate around the second direction X relative to the second adjusting member 24 and the supporting mechanism 1, the device 100 can be carried to move, and an angle of pitch of the device 100 can be adjusted.

In one embodiment, two hinges 23 hinge the two second adjusting members 24 respectively on groove walls on two sides of the first installation groove 221, hinge connection is stable, and rotation is smooth.

In one embodiment, two first adjusting holes 2421 are formed in two ends of each second adjusting member 24, a hinge hole 223 is formed at a position between the two first adjusting holes 2421, the adjusting mechanism 2 further includes second fasteners 25, and each second fastener 25 is arranged to pass through a corresponding first adjusting hole 2421 to be in bolt connection with the first adjusting member 22. Through the arrangement of the first adjusting holes 2421, a position of the first adjusting member 22 relative to the second adjusting member 24 can be adjusted by rotating the first adjusting member 22, and the position of the first adjusting member 22 relative to the second adjusting member 24 can further be locked through the second fastener 25, therefore locking the angle of pitch of the device 100.

In this embodiment, the second fastener 25 is a hexagon socket bolt.

In one embodiment, each of the two first adjusting holes 2421 has an equal distance to the hinge hole 223. Through the above arrangement, smooth rotation of the first adjusting member 22 can be ensured, preventing any jamming.

In one embodiment, a major axis of each first adjusting hole 2421 is a line segment along a circle centered at a center point of the hinge hole 223. When the first adjusting member 22 needs to be rotated, it is merely necessary to loosen the second fastener 25. At the moment, rotation of the first adjusting member 22 will carry the second fastener 25 to rotate together with the hinge 23. By arranging the major axis of each first adjusting hole 2421 to be the line segment along the circle centered at the center point of the hinge hole 223, interference of the first adjusting hole 2421 on the second fastener 25 can be prevented, and smooth rotation is thereby ensured.

Figure 9:
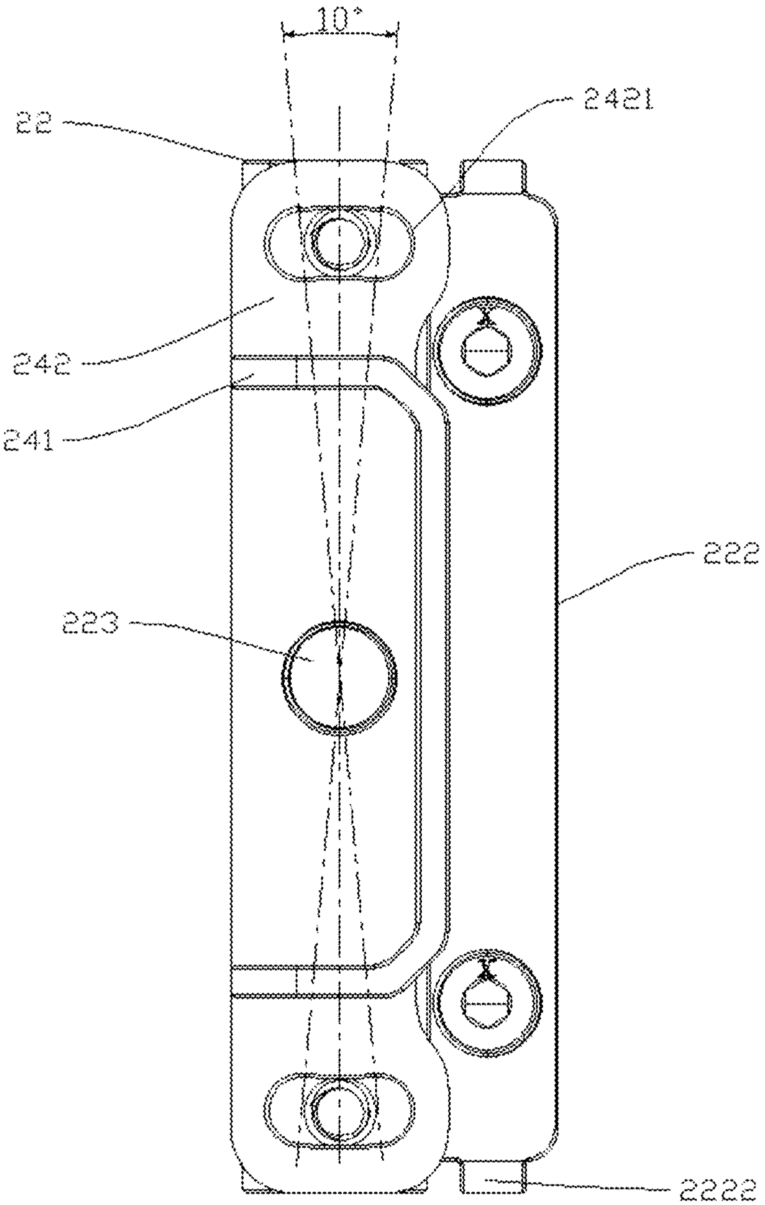
FIG. 9 is yet another schematic diagram of a status of adjusting an angle of pitch of a connecting mechanism in an embodiment of the present disclosure.

In one embodiment, as shown in FIG. 9, a range of the first adjusting hole 2421 carrying the first adjusting member 22 to rotate is 0° to 5°. That is, when the first adjusting member 22 is in a vertical position, it may rotate forward or backward by 5° at most, realizing an adjusting range of 10°. In other embodiments, a size of the first adjusting hole may be set according to the user's needs, and the rotation range of the first adjusting member 2421 may therefore be changed.

In one embodiment, the second adjusting member 24 includes a first part 241 and a second part 242. The first part 241 is in a C shape, one end of the supporting mechanism 1 is arranged in a connecting groove of the first part 241, the second part 242 is arranged on a side of the first part 241, the first adjusting hole 2421 and the hinge hole 223 are formed in the second part 242, two ends of the second part 242 extend out of the first part 241, and the two first adjusting holes 2421 are both arranged outside the connecting groove of the first part 241, so the user can screw the second fastener 25 to adjust conveniently.

In one embodiment, the connecting mechanism 3 further includes a surface frame 32 and connecting supports 33. The surface frame 32 includes two horizontal rods 321 and two vertical rods 322, the horizontal rods 321 and the vertical rods 322 are vertically arranged, the two horizontal rods 321 and the two vertical rods 322 form a rectangle, the two horizontal rods 321 are slidably arranged at upper and lower ends of the panel 31 in a penetrating mode, the surface frame 32 can move relative to the panel 31 in a horizontal direction, the two connecting supports 33 are arranged, and one surfaces of the two connecting supports 33 are connected to the surface frame 32 and the other surfaces are connected to the device 100. Through the surface frame 32 and the supports, the device 100 and the connecting mechanism 3 may be connected easily and rapidly, and adjustment of the device 100 in the second direction X is realized.

Figure 10:
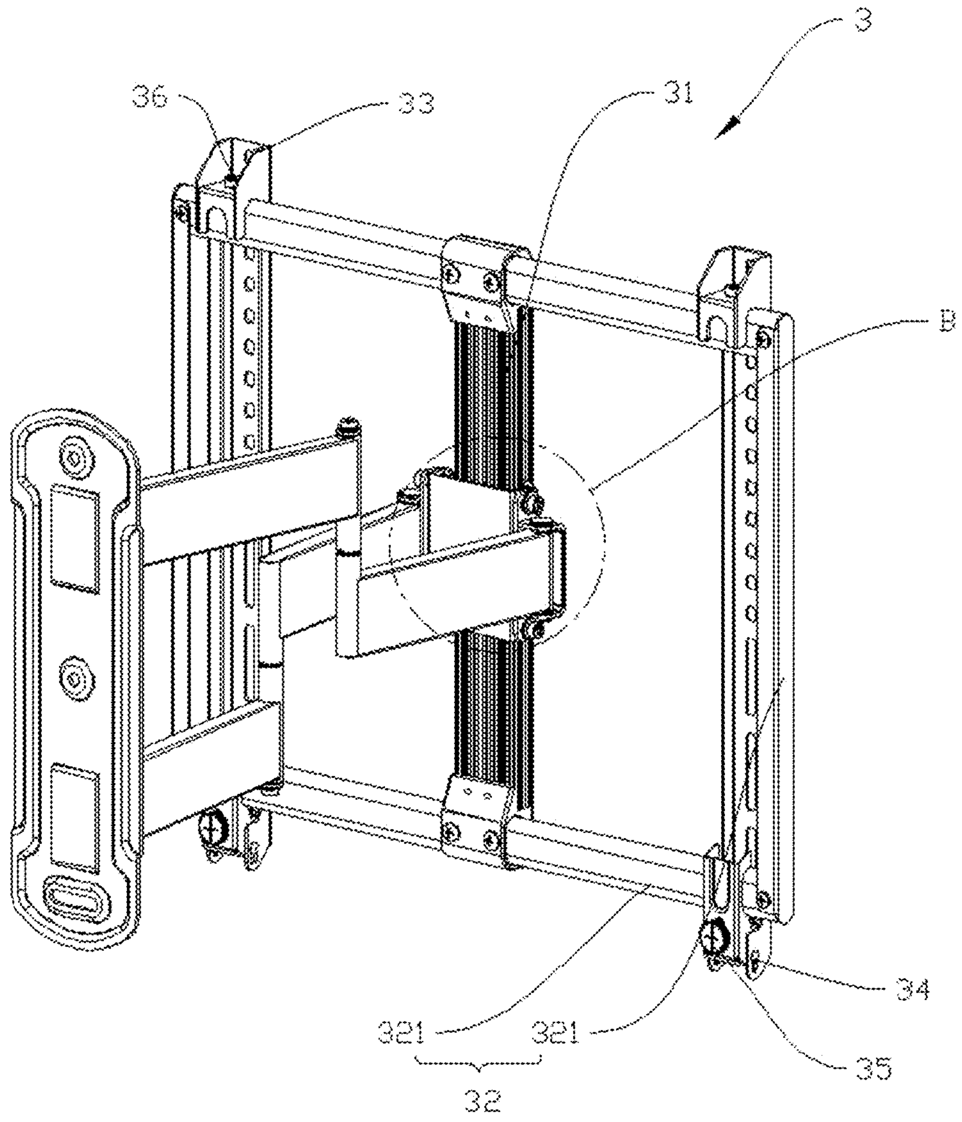
FIG. 10 is a schematic structural diagram of another adjustable bracket in an embodiment of the present disclosure.
Figure 11:
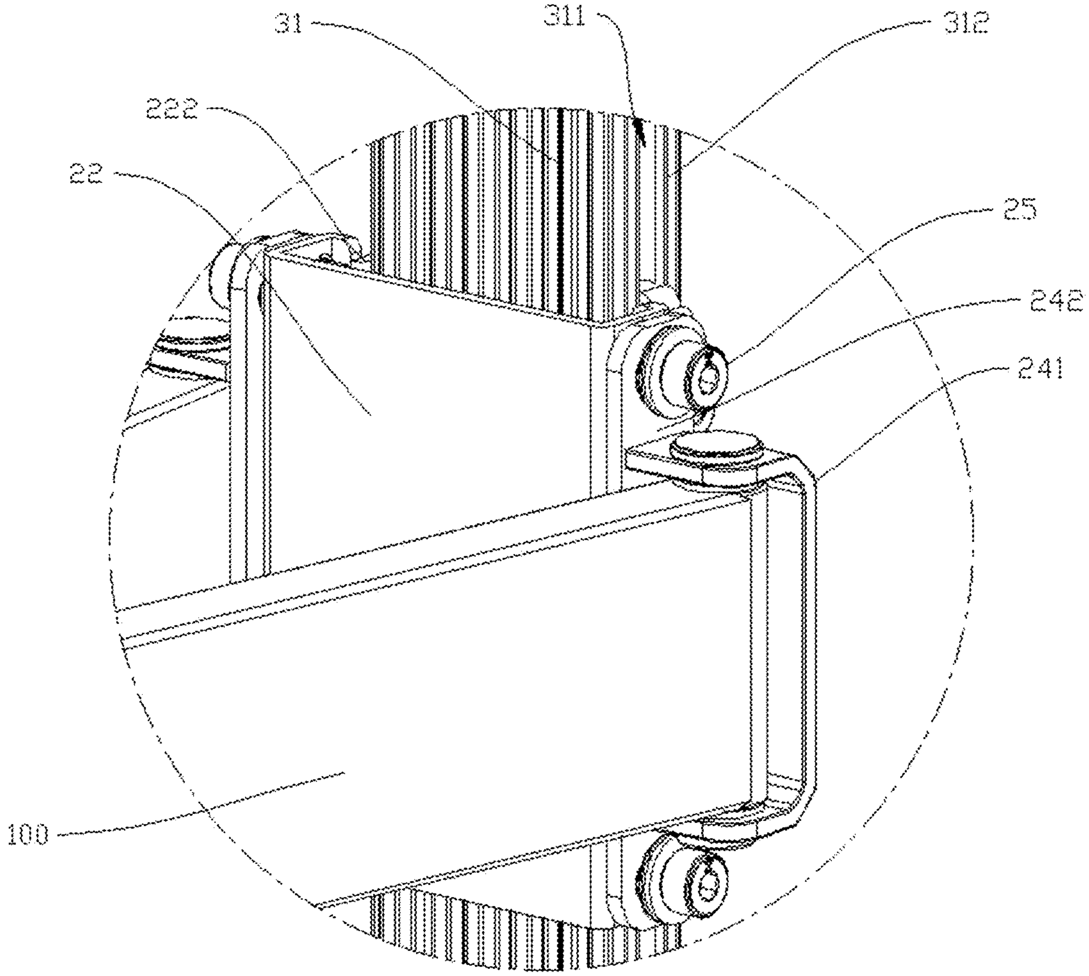
FIG. 11 is an enlarged view of a position B in FIG. 8.
Figure 12:
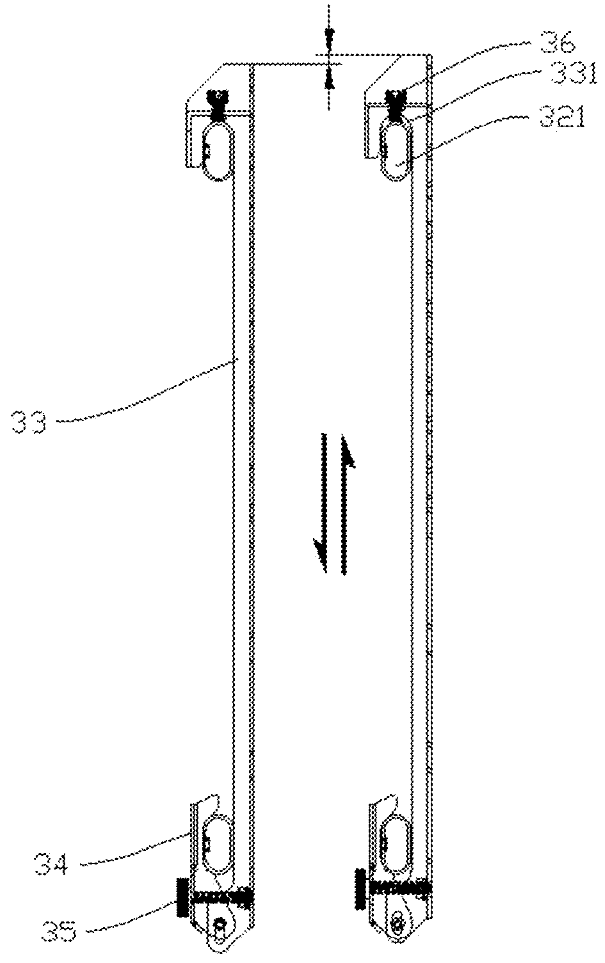
FIG. 12 is a schematic diagram of two connecting supports at different horizontal positions in an embodiment of the present disclosure.
Figure 13:
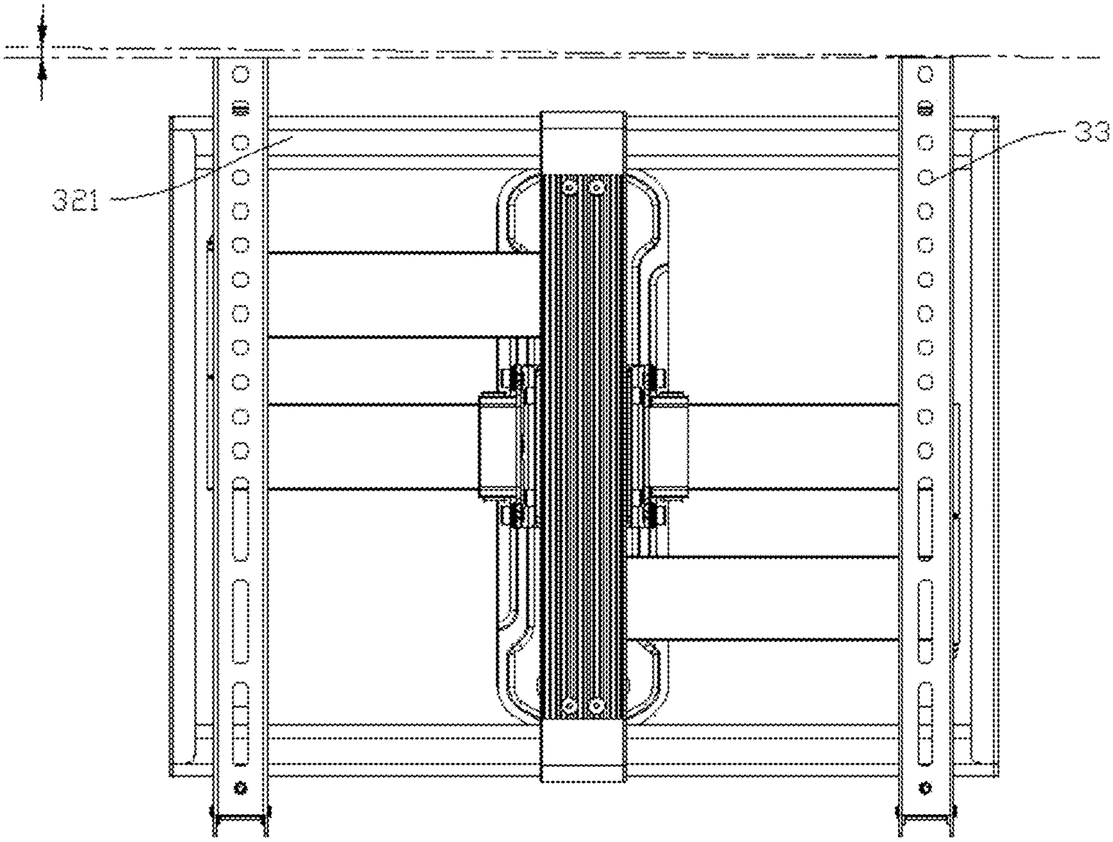
FIG. 13 is another schematic diagram of two connecting supports at different horizontal positions in an embodiment of the present disclosure.
Figure 14:
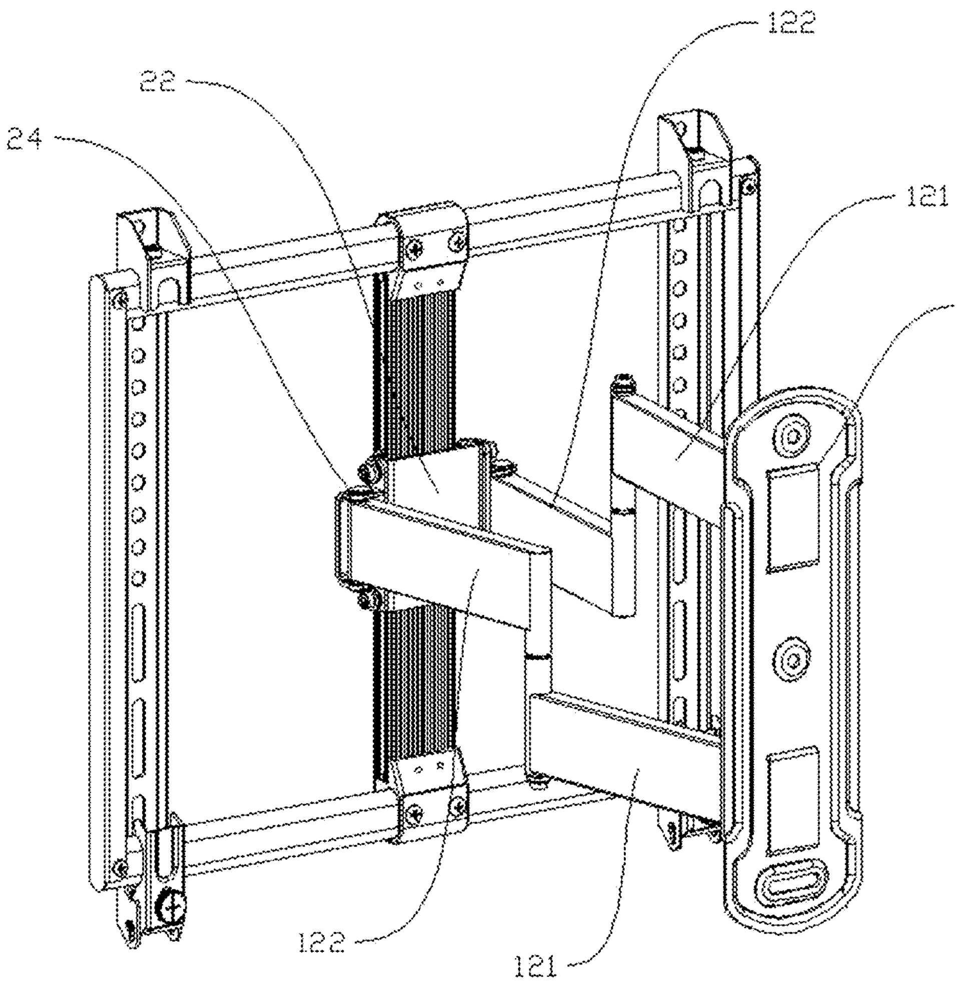
FIG. 14 is a schematic diagram of a connecting rod assembly in an unfolding status in an embodiment of the present disclosure.
Figure 15:
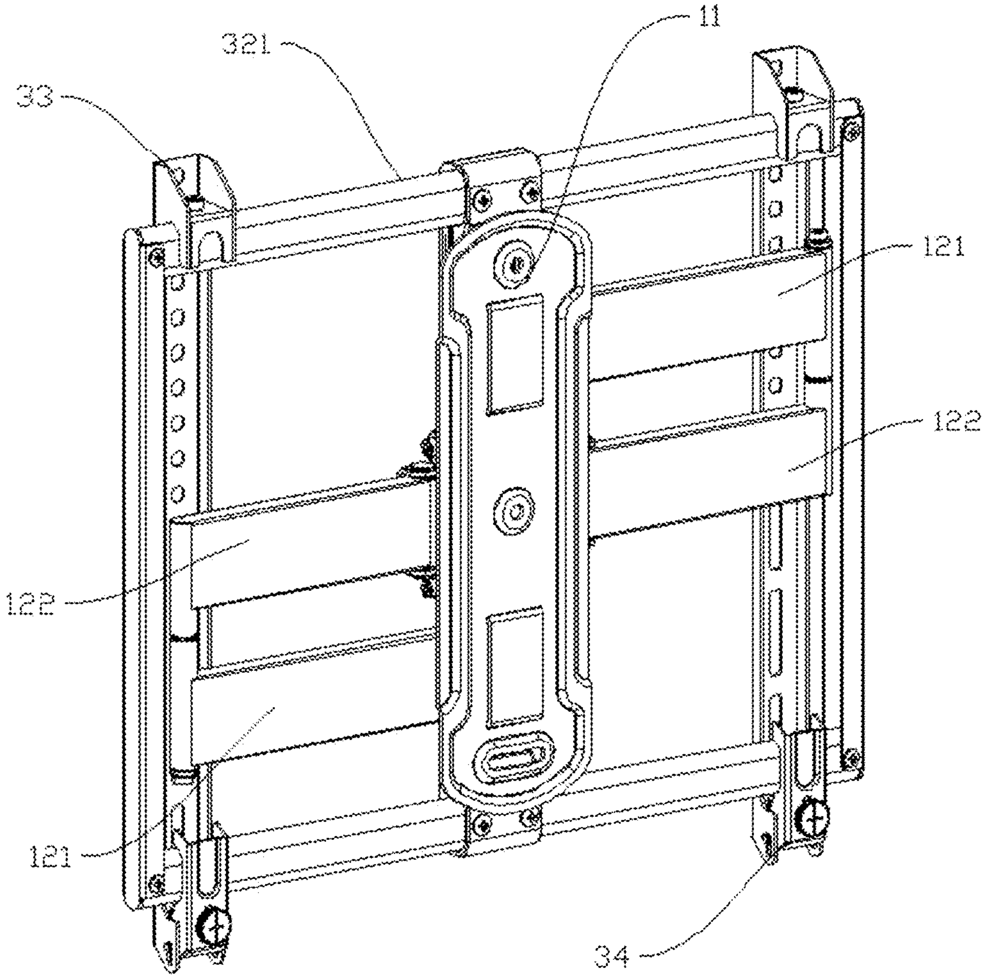
FIG. 15 is a schematic diagram of a connecting rod assembly in a folding status in an embodiment of the present disclosure.

In one embodiment, as shown in FIG. 9 to FIG. 11, a second installation groove 331 is formed in an upper end of each connecting support 33, the connecting support 33 is hooked on the corresponding horizontal rod 321 at the upper end of the panel 31 through the second installation groove 331, a safety latch 34 is arranged at a lower end of the connecting support 33, the safety latch 34 is hinged to the lower end of the connecting support 33, and the safety latch 34 is configured to rotate upwards and clasp the horizontal rod 321 at the lower end of the panel 31. Mounting is simple and rapid, and adjustment of horizontal positions is convenient.

In one embodiment, the safety latch 34 is locked at the lower end of the connecting support 33 through a third fastener 35, so downward rotation of the safety latch 34 is prevented.

In one embodiment, a second adjusting hole is formed in the upper end of each connecting support 33, the second adjusting hole penetrates through a bottom of the second installation groove 331, the connecting mechanism 3 further includes an adjusting bolt 36, and the adjusting bolt 36 is in bolt connection with the second installation groove 331 and abuts against the horizontal rod 321 at the upper end. Through the arrangement that the adjusting bolt 36 is in bolt connection with the second adjusting hole and abuts against the horizontal rod 321, when the adjusting bolt 36 is fastened, the adjusting bolt 36 will abut against the connecting support 33 upwards relative to the horizontal rod 321; and when the adjusting bolt 36 is loosened, the connecting support 33 will be lowered under the effect of gravity. Therefore, merely by screwing the adjusting bolt 36, a height of a single connecting support 33 relative to the surface frame 32 may be adjusted in a refined way, so that the two connecting supports 33 may be located at the same horizontal position, thus maintaining the horizontal position of the device 100.

In one embodiment, the supporting mechanism 1 includes a supporting plate 11 and two connecting rod assemblies 12, the supporting plate 11 is fixedly connected to the wall body, one ends of the two connecting rod assemblies 12 are hinged to the supporting plate 11, and the other ends are hinged to the first part 241 of the second adjusting member 24. Through the two connecting rod assemblies 12, a distance between the surface frame 32 and the supporting plate 11, i.e. the wall body, may be changed, a position of the connecting mechanism 3 can therefore be adjusted in a third direction Y, a distance between the device 100 and the user may be adjusted, and the device 100 is at a position facilitating comfortable user experience.

In one embodiment, each connecting rod assembly 12 includes a first supporting arm 121 and a second supporting arm 122, the first supporting arm 121 is hinged to the supporting plate 11, the second supporting arm 122 is hinged to the second adjusting member 24, and the second supporting arm 122 is hinged to the first supporting arm 121. By changing an included angle between the first supporting arm 121 and the second supporting arm 122, a distance between the connecting mechanism 3 and the supporting plate 11 may be changed.

In one embodiment, the first supporting arms 121 of the two connecting rod assemblies 12 are mounted at positions of different heights on the supporting plate 11 in the first direction Z, and the two second supporting arms 122 are at the same height in the first direction Z. Through the above arrangement, volumes of the first connecting member 22 and the second connecting member 24 can be reduced, a weight of the adjusting mechanism 2 is reduced, and a moment of force generated by the adjusting mechanism 2 on the supporting mechanism 1 is thereby reduced. Meanwhile, the first supporting arms 121 connected to the supporting plate 11 at different heights may disperse the moment of force to the entire supporting plate 11, thus realizing even stress and a good bearing effect.

It should be noted that, in the embodiment, the first direction Z is a vertical direction, and the second direction X and the third direction Y are two directions perpendicular to each other on a horizontal plane.

Figure 16:
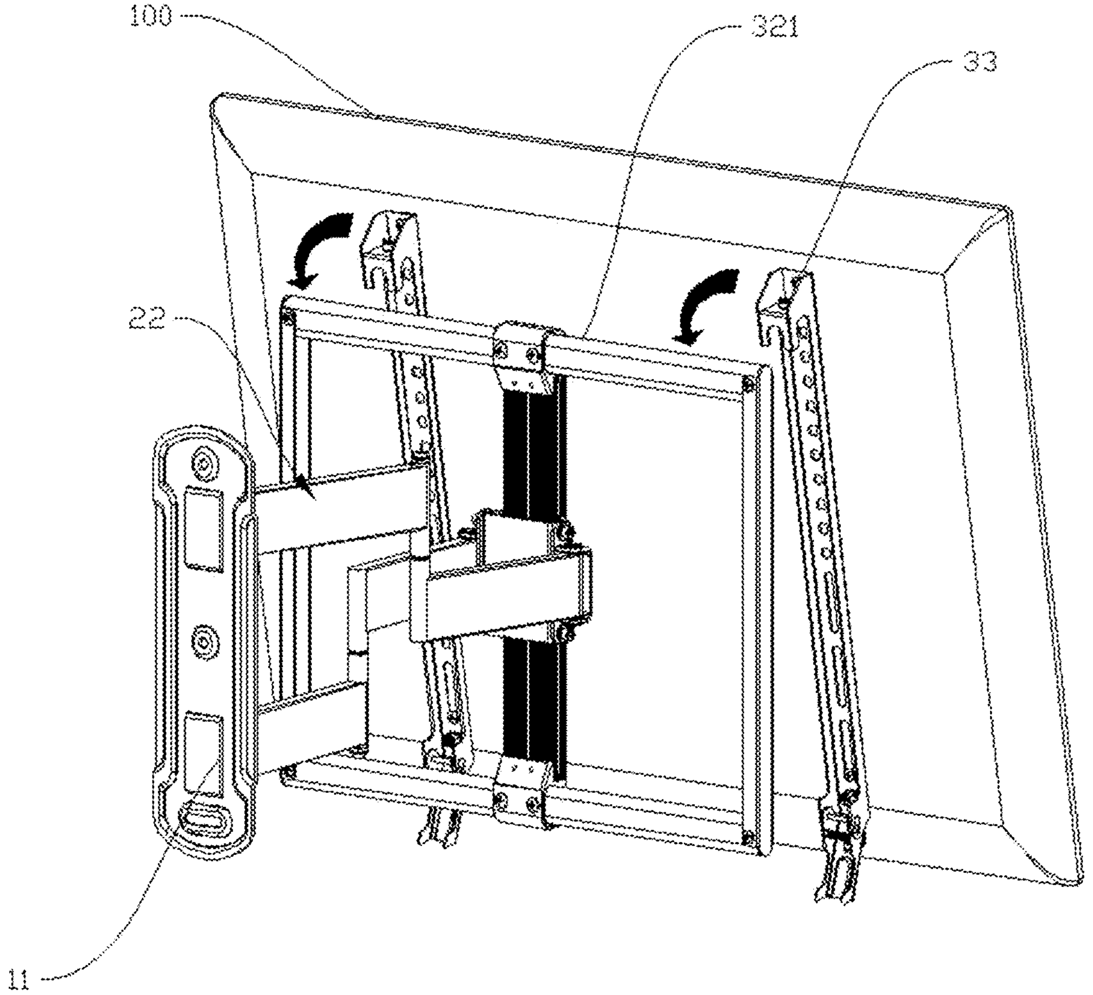
FIG. 16 is a first schematic diagram of mounting connecting supports and a device in an embodiment of the present disclosure.
Figure 17:
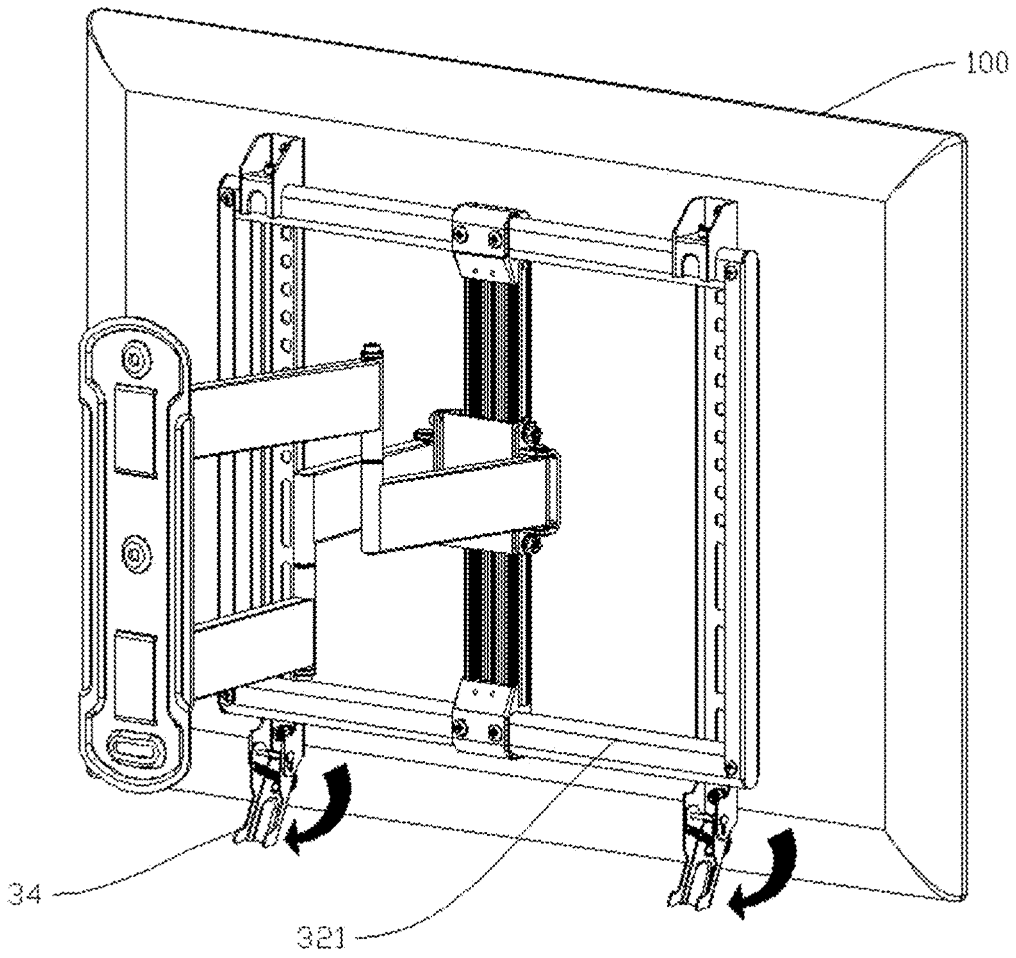
FIG. 17 is a second schematic diagram of mounting connecting supports and a device in an embodiment of the present disclosure.
Figure 18:
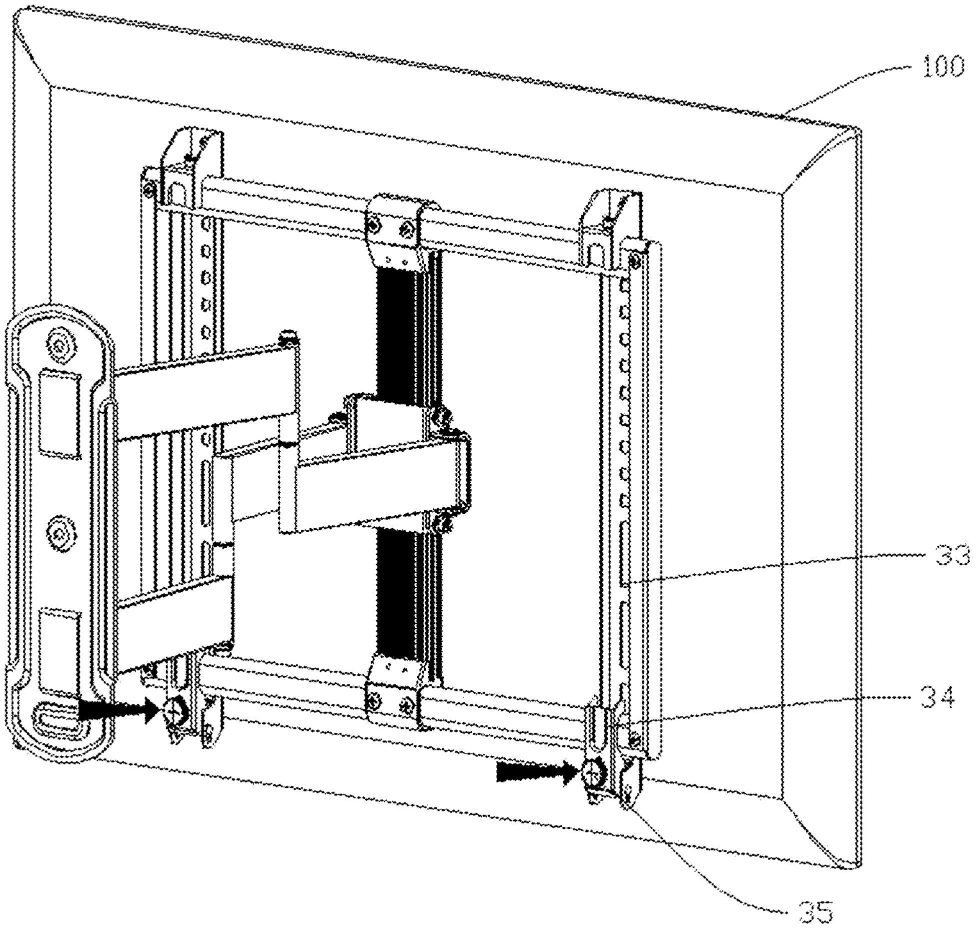
FIG. 18 is a third schematic diagram of mounting connecting supports and a device in an embodiment of the present disclosure.

A mounting process of the adjustable bracket provided by the embodiment is roughly as follows:

As shown in FIG. 16 to FIG. 18, firstly the supporting plate 11 of the supporting mechanism 1 is connected to the wall body, and then the adjusting mechanism 2, the connecting mechanism 3 and the like are mounted in sequence. The connecting supports 33 of the connecting mechanism 3 are connected with the device 100 firstly;

- the safety latch 34 of each connecting support 33 is unlocked, and the second installation groove 331 is aligned with the horizontal rod 321 at the upper end and is hanged on the horizontal rod 321;
- the safety latch 34 is rotated to buckle the horizontal rod 321 at the lower end, and the third fastener 35 is fastened to complete fixation;
- heights of the two connecting supports 33 are adjusted through the adjusting bolts 36 to maintain the device 100 at a horizontal position;
- the first fastener 4 is loosened, so that the surface frame 32 carries the device 100 to move in the first direction Z, and the first fastener 4 is fastened after the device 100 is adjusted to a suitable height position;
- the second fastener 25 is loosened, so that the surface frame 32 carries the device 100 to move in the second direction X, and the second fastener 25 is fastened after the device 100 is adjusted to a suitable angle of pitch;
- the surface frame 32 carries the device 100 to move in the second direction X and adjusts it to a suitable position; and
- the device 100 is pulled to unfold or fold the connecting rod assemblies 12, so that a suitable distance is provided between the device 100 and a user watching position, and adjustment is finished at the moment.

The adjustable bracket can adjust the positions of the device 100 in the first direction Z, the second direction X and the third direction Y, the position of the device 100 can be freely changed in a certain range, and the device 100 can rotate around the second direction X so as to change the angle of pitch of the device 100. The adjustable bracket with multiple degrees of freedom can satisfy the user's using needs as much as possible, so the device 100 is at the optimal using status.

Although embodiments of the present disclosure are described in conjunction with the accompanying drawings, those skilled in the art may make various modifications and variations without departing from the spirit and scope of the present disclosure, and such modifications and variations fall within the scope defined by the appended claims.

The invention claimed is:

1. An adjustable bracket, configured to connect a device and a wall body, and comprising:

- a supporting mechanism, wherein one end of the supporting mechanism is connected to the wall body;
- an adjusting mechanism, arranged at the other end of the supporting mechanism; and
- a connecting mechanism, wherein the device is connected to the adjusting mechanism through the connecting mechanism, the adjusting mechanism comprises sliding blocks, sliding grooves are formed in the connecting mechanism, a length direction of the sliding groove is arranged in a first direction Z, the sliding block is slidably arranged in the sliding groove, the connecting mechanism is configured to carry the device to move in the length direction of the sliding groove, and a position of the connecting mechanism relative to the adjusting mechanism is able to be fastened by a first fastener.

2. The adjustable bracket according to claim 1, wherein the connecting mechanism comprises a panel, sliding grooves are formed in two sides of the panel, the sliding grooves extend in a length direction of the panel, the adjusting mechanism comprises two sliding blocks, and one sliding block is arranged in each of the sliding grooves.

3. The adjustable bracket according to claim 2, wherein two side walls of each sliding groove bend towards each other at an opening of the sliding groove to form a first position-limiting part.

4. The adjustable bracket according to claim 2, wherein the adjusting mechanism further comprises a first adjusting member, a first installation groove is formed in the first adjusting member, the panel is slidably arranged in the first installation groove, and the two sliding blocks are arranged on two sides of an opening of the first installation groove.

5. The adjustable bracket according to claim 4, wherein the first adjusting member is provided with first connecting plates arranged on the two sides of the opening of the first installation groove, a first connecting hole is formed in each first connecting plate, one end of the first fastener is in bolt connection with a corresponding first connecting hole and a corresponding sliding block, and the other end of the first fastener is configured to abut against a bottom of a corresponding sliding groove.

6. The adjustable bracket according to claim 5, wherein limiting protrusions are formed on two ends, in the length direction of the sliding groove, of each first connecting plate, and the limiting protrusions extend in a depth direction of the sliding groove.

7. The adjustable bracket according to claim 4, wherein the adjusting mechanism further comprises a hinge and two second adjusting members, the second adjusting members are connected with the supporting mechanism, the second adjusting members are hinged to the first adjusting member by means of the hinge, and the first adjusting member is able to carry the sliding blocks and the connecting mechanism to rotate around a second direction X.

8. The adjustable bracket according to claim 7, wherein two first adjusting holes are formed in two ends of each second adjusting member, a hinge hole is formed at a position between the two first adjusting holes, the adjusting mechanism further comprises second fasteners, and each second fastener is arranged to pass through a corresponding first adjusting hole to be in bolt connection with the first adjusting member.

9. The adjustable bracket according to claim 8, wherein each of the two first adjusting holes has an equal distance to the hinge hole.

10. The adjustable bracket according to claim 8, wherein a major axis of each first adjusting hole is a line segment along a circle centered at a center point of the hinge hole.

* * * * *